US010143949B2

(12) United States Patent
Taszarek et al.

(10) Patent No.: US 10,143,949 B2
(45) Date of Patent: Dec. 4, 2018

(54) METHOD OF MANUFACTURING A CARTRIDGE FOR A FLUID TREATMENT SYSTEM

(71) Applicant: BRITA GmbH, Taunusstein (DE)

(72) Inventors: Josef Taszarek, Taunusstein (DE); Gunder Guckes, Waldems (DE); Maria Festner, Wiesbaden (DE); Uwe Lang, Taunusstein (DE); Tobias Schuler, Dreieich (DE); Juergen Forst, Hohenstein (DE); Thomas Hoerning, Taunusstein (DE)

(73) Assignee: BRITA GMBH, Taunusstein (DE)

( * ) Notice: Subject to any disclaimer, the term of this patent is extended or adjusted under 35 U.S.C. 154(b) by 71 days.

(21) Appl. No.: 14/385,131

(22) PCT Filed: Mar. 20, 2013

(86) PCT No.: PCT/EP2013/055750
§ 371 (c)(1),
(2) Date: Sep. 12, 2014

(87) PCT Pub. No.: WO2013/139821
PCT Pub. Date: Sep. 26, 2013

(65) Prior Publication Data
US 2015/0041385 A1    Feb. 12, 2015

(30) Foreign Application Priority Data

Mar. 20, 2012 (EP) .................................. 12160392

(51) Int. Cl.
B01D 35/30        (2006.01)
C02F 1/00         (2006.01)

(52) U.S. Cl.
CPC .............. B01D 35/30 (2013.01); C02F 1/002 (2013.01); C02F 1/003 (2013.01);
(Continued)

(58) Field of Classification Search
CPC ........................... B01D 35/30; B01D 2201/29; B01D 2201/30; B01D 35/00; B01D 36/001;
(Continued)

(56) References Cited

U.S. PATENT DOCUMENTS 4,061,807 A    12/1977  Shaler et al.
4,764,274 A *   8/1988  Miller .................... C02F 1/003
                                                     210/232
(Continued)

FOREIGN PATENT DOCUMENTS

CH              675519 A5      10/1990
CN           201061735 Y        5/2008
(Continued)

OTHER PUBLICATIONS

International Application No. PCT/EP2013/055750 International Preliminary Report on Patentability dated Sep. 23, 2014 (7 Pages).
(Continued)

Primary Examiner — Madeline Gonzalez
(74) Attorney, Agent, or Firm — Keller Jolley Preece

(57) ABSTRACT

A method of manufacturing a cartridge for a fluid treatment system, wherein the cartridge includes a housing defining at least one chamber for a fluid treatment medium, includes providing a cartridge housing part including at least one wall defining at least one opening closable by a filter element. The filter element includes a porous body for at least mechanically filtering fluid flowing into the filter element through at least one first surface area of the filter element, through the porous body and out through at least one second surface area of the filter element. The filter element includes a rim, covering at least a peripheral face of the porous body so as to frame the first and second surface areas. The filter element is combined with the cartridge housing part so as to
(Continued)

close at least one of the at least one openings by bonding the rim to the cartridge housing part.

37 Claims, 9 Drawing Sheets

(52) U.S. Cl.
CPC .... *C02F 2201/006* (2013.01); *C02F 2307/04* (2013.01); *Y10T 29/49826* (2015.01)

(58) Field of Classification Search
CPC ...... B01D 24/10; B01D 27/02; B01D 35/027; B01D 35/0273; B01D 35/0276; C02F 1/002; C02F 1/003; C02F 2201/006; C02F 2307/04; Y10T 29/49826
USPC ....... 210/435, 282, 470, 472, 473, 464, 468, 210/266, 436
See application file for complete search history.

(56) References Cited

U.S. PATENT DOCUMENTS

| | | | |
|---|---|---|---|
| 5,049,272 A * | 9/1991 | Nieweg | B01D 24/04 210/266 |
| 5,167,819 A | 12/1992 | Iana et al. | |
| 5,225,078 A * | 7/1993 | Polasky | C02F 1/003 210/264 |
| 5,505,120 A | 4/1996 | Albertson | |
| 5,635,063 A | 6/1997 | Rajan et al. | |
| 5,652,008 A | 7/1997 | Heiligman | |
| 6,189,704 B1 * | 2/2001 | Dennehey | A61B 10/025 210/435 |
| 6,558,542 B2 | 5/2003 | Cyrson | |
| 6,818,130 B1 | 11/2004 | Varriale et al. | |
| 7,510,088 B2 | 3/2009 | Smith et al. | |
| 7,972,519 B2 | 7/2011 | Koos et al. | |
| 2004/0060873 A1 | 4/2004 | Yanou et al. | |
| 2008/0257165 A1 | 10/2008 | Bolzicco et al. | |
| 2009/0294350 A1 | 12/2009 | Moretto | |
| 2010/0122952 A1 | 5/2010 | South et al. | |
| 2011/0042298 A1 * | 2/2011 | Stouffer | B01D 39/2062 210/443 |

FOREIGN PATENT DOCUMENTS

| | | |
|---|---|---|
| CN | 201157707 Y | 12/2008 |
| CN | 201223747 Y | 4/2009 |
| CN | 201415078 Y | 3/2010 |
| CN | 101695430 A | 4/2010 |
| CN | 201571940 U | 9/2010 |
| CN | 201711013 U | 1/2011 |
| CN | 201718928 U | 1/2011 |
| CN | 101973647 A | 2/2011 |
| CN | 201770507 U | 3/2011 |
| CN | 102026720 A | 4/2011 |
| DE | 196 54 949 | 3/1996 |
| DE | 102010001729 A1 | 8/2011 |
| EP | 0 172 003 | 2/1986 |
| EP | 1510503 B1 | 2/2008 |
| JP | 05-007387 U | 2/1993 |
| JP | 2002-540927 | 12/2002 |
| JP | 2003-071443 | 3/2003 |
| JP | 2011-078900 | 7/2011 |
| KR | 100846199 B1 | 7/2008 |
| KR | 20090011222 U | 11/2009 |
| RU | 2132729 C1 | 7/1999 |
| RU | 2162010 C1 | 1/2001 |
| RU | 2241599 C1 | 12/2004 |
| RU | 2353419 C2 | 4/2009 |
| TW | 430571 B | 4/2001 |
| WO | 1997/036666 | 10/1997 |
| WO | WO 9910076 A1 | 3/1999 |
| WO | WO 0020299 A1 | 4/2000 |
| WO | 2001032560 | 5/2001 |
| WO | 2005092155 | 10/2005 |
| WO | WO 07003259 A1 | 1/2007 |
| WO | 2009140033 | 11/2009 |

OTHER PUBLICATIONS

Decision of Refusal as received in Japanese Patent Application 2015-500897 dated Mar. 14, 2017.

* cited by examiner

METHOD OF MANUFACTURING A CARTRIDGE FOR A FLUID TREATMENT SYSTEM

CROSS-REFERENCE TO RELATED APPLICATIONS

This application is a national phase entry under 35 U.S.C. § 371 of International Application No. PCT/EP2013/055750, filed Mar. 20, 2013, which claims the benefit of European Application No. 12160392.2, filed Mar. 20, 2012. The entire contents of each of the foregoing patent applications are hereby incorporated by reference.

BACKGROUND OF THE INVENTION

1. Field of the Invention.

The invention relates to a method of manufacturing a filter cartridge.

The invention also related to a filter cartridge obtainable by means of such a method.

2. Background and Relevant Art.

International patent application No. PCT/EP2011/073171 was filed before and published after the present application and thus constitutes prior art pursuant to Art. 54(3) EPC. It discloses a container for treating a fluid. The container is provided with walls comprising a side wall and a first end wall. The side wall and end wall are provided as one component part and define an inner space of a container. The first end wall is provided with a section pervious to fluid. A treatment agent is inserted in the inner space of the container. It can be provided in the shape of granular ion exchanger material, for example. The inner space of the container is closed off by means of a second end wall, to which end the second end wall is joined to the side wall along a contact area. The second end wall can be joined with the side wall by pressing, flanging, hot caulking or other joining techniques. The second end wall is provided with a filter section exhibiting a plurality of capillaries. In the example, the second end wall takes the form of a plate-shaped sintered filter body that forms capillaries. The filter section extends across the entirety of the second end wall.

BRIEF SUMMARY OF THE INVENTION

It is an object of the invention to provide a method of manufacturing a filter cartridge and a filter cartridge, where the cartridge can be filled with a fluid treatment medium that is securely held within the cartridge by the filter element whilst disfiguration of the cartridge is largely avoided and handling of the filter element at the manufacturing stage is facilitated.

This object is achieved by a method of manufacturing a cartridge for a fluid treatment system, wherein the cartridge includes a housing defining a chamber for a fluid treatment medium, including:

providing a cartridge housing part including at least one wall defining at least one opening closable by a filter element;

providing the filter element, wherein the filter element includes a porous body for at least mechanically filtering fluid flowing into the filter element through at least one first surface area of the filter element, through the porous body and out through at least one second surface area of the filter element, wherein the filter element includes a rim, impervious to fluid and covering at least a peripheral face of the porous body so as to frame the first and second surface areas; and combining the filter element with the cartridge housing part so as to close at least one of the at least one openings by bonding the rim to the cartridge housing part.

In the present context, the term bonding is understood to denote the formation of a joint between the material of the rim and that of the cartridge housing part such that these materials and optionally an adhesive or filler material are coalesced, a type of joint also referred to as positive material joint. In particular, the term includes welding, soldering and adhesive bonding.

The or each peripheral face extends from a first face of the porous body, which first face is parallel to or corresponds to the first surface area(s), to a second face of the porous body, which second face is parallel to or corresponds to the second surface area(s).

Common fluid treatment media tend to swell upon first use, which can result in pressure on the cartridge housing. Bonding the rim to the cartridge housing part makes it less likely that the filter element will be dislodged. The ability to withstand pressure from within the cartridge housing allows the filter element to be combined with the cartridge housing part from the outside, rather than from within the cartridge housing part. This increases the range of shapes that the cartridge housing part can have. Because the filter element is provided with a rim that covers at least a peripheral face of the porous body, and will generally also extend over the edges of the peripheral face, the porous body is easier to handle during manufacturing. The porous body will typically be somewhat brittle, so that there would otherwise be a risk of splinters or dust breaking off the edges during handling. By first providing a rim, the filter element can be manufactured at a different site than the rest of the cartridge and transported to the location where the cartridge is filled with fluid treatment medium and assembled. By providing a separate rim and joining that to the cartridge housing part, rather than insert moulding the cartridge housing part with the porous body as the insert, it can be prevented that particles of the porous body break off and migrate to the surface of the cartridge housing part in the moulding process. This helps prevent disfiguration of the walls of the cartridge housing part, in particular where the porous body and the cartridge housing part have contrasting colours.

The rim is a component distinct from the porous body and may thus have different properties. It may have the same colour, indeed the same or a similar material composition as the cartridge housing part. Both may, for example, be made of poly-propylene, whereas the porous body may be a ceramic or comprise a high-density polyethylene. The rim has a lower permeability to fluid than the porous body. In particular, it may be essentially impervious to fluid. Therefore, it can play a role in preventing bypasses of fluid, so that fluid treated by the fluid treatment medium is forced also to pass through the filter element, in particular the porous body. The fluid treatment medium can thus be a relatively fine-grained medium that is filtered out as the fluid leaves the cartridge. In other embodiments, the filter element can play an even more important role in the treatment of the fluid, e.g. by removing substances and/or particles already present in the fluid before it entered the cartridge. In this case, because the filter element fulfils the dual function of closing off the housing and filtering the fluid, the cartridge can be made relatively compact or have a relatively high treatment capacity relative to its size.

It is observed that U.S. Pat. No. 5,225,078 discloses a pour-through pitcher filter assembly including four parts, namely a pitcher for receiving and dispensing filtered water, a reservoir for holding the water to be filtered, a filter element positioned in the lower end of the reservoir and a lid or cover for closing an upper end of the reservoir. The reservoir is preferably made of a suitable plastic, such as polypropylene, and may most conveniently be manufactured by a blow-moulding process. The filter element comprises a rigid porous carbon block in the shape of a thin disk. The carbon block may be made in a conventional manner, wherein granular activated carbon and a suitable binder, such as polyethylene, are compressed and heated to form a moulded porous block. An annular synthetic rubber seal is attached to the outer periphery of the carbon block. The rubber seal may comprise a neoprene-like material and one particularly suitable seal material is one that is sold under the trade mark KRATON. The seal is preferably formed by injection moulding around the carbon block, the latter being positioned as a core element in an insert moulding die. The seal is formed with upper and lower annular lips. The lips help hold the seal element in position around the edge of the carbon block. An outer wall of the reservoir immediately above a drain opening is provided with an annular recess. The sealing face of the seal is shaped and dimensioned to fit tightly into the annular recess with a fairly tight compression fit as the filter element is pressed axially upwardly into the drain opening. In an alternate construction, the lower end of the reservoir defining the drain opening could be moulded directly to and around the edge of the carbon block. The seal in such an integrally moulded construction could be enhanced by providing the sintered carbon block with an excess of polyethylene or other resin binder material, particularly around the outer peripheral face, to soften or melt and seal with the polypropylene material from which the reservoir is moulded. The reservoir does not contain a fluid treatment medium and the rubber seal is not bonded to the reservoir.

In an embodiment of the method according to the invention, the rim is welded to the cartridge housing part.

This embodiment makes it easier to produce a cartridge for treating potable fluids, e.g. water. There is no need to use a food-grade adhesive for bonding the rim to the cartridge housing part. This in turn also increases the range of potentially suitable materials for the rim and the cartridge housing part.

In an embodiment, the porous body is essentially planar, and the first and second surface areas are essentially parallel to the plane of the porous body and face in opposite directions.

The porous body therefore has an essentially uniform thickness. The flow resistance of the filter element is thus also essentially uniform across the plane of the filter element, assuming the porosity does not vary. Since the filter element is used to close off the cartridge, this means that the pressure distribution in the cartridge chamber can be more uniform, which helps to ensure that there are no shortcuts for the fluid through the fluid treatment medium, especially in embodiments in which the area of the filter element is relatively large. A further effect of using an essentially planar porous body is that it can be cut or punched from a larger sheet or web of porous material. Moreover, a planar porous body will also generally imply an essentially planar filter element (although the rim will generally protrude slightly where it covers the edges), making it easier to integrate it into a wall of the cartridge housing.

It is observed that the first and second surface areas need not necessarily be surfaces of the porous body. In a variant, one or more surfaces of the porous body parallel to the plane of the porous body are covered with a layer of permeable material, e.g. a sheet of woven or non-woven material. The mesh size of the sheet of material can be made smaller than a median or even a minimum diameter of particles comprised in the porous body.

In an embodiment, the porous body is self-supporting.

An effect is that as large a filter area as possible can be provided, since there need be no support frame extending across the surface of the filter element. The rim is also easier to produce, since it need merely extend around the circumference of the porous body, but there need be no struts across the surface of the porous body. In this embodiment, there will consequently be only one first surface area and one second surface area.

In a first embodiment of the method, the step of providing the filter element includes:

providing an amount of loose material including a binder in a mould; and causing the loose material to be bound in the mould to form the porous body.

Compared to methods in which the porous body is cut from a sheet of porous material, this embodiment leads to less wastage. The porous material can thus comprise higher-value materials, including materials for the treatment of fluid by sorption (including adsorption and ion exchange). The interior dimensions of the mould will generally correspond to those of the rim, at least in directions lying in a plane framed by the rim.

A variant of the first embodiment includes:

providing the rim; and using the rim as at least part of the mould, wherein the step of causing the loose material to be bound in the mould includes causing the porous body to bind to the rim.

An effect is that it is not necessary to include a separate step of combining the porous body with the rim. Moreover, any risk of damage to the porous body at a stage prior to combining it with the rim is essentially eliminated.

The step of causing the loose material to be bound to form the porous body includes applying heat to at least the loose material.

This is easier than causing the loose material to become tacky through e.g. friction, especially where the porous body is to have a relatively high porosity.

The application of heat may include applying heat through at least one heated die.

An effect is to ensure adequate adhesion between the constituents of the loose material and between the loose material and the rim by enabling the application of at least a small amount of pressure. Relatively accurate control of the porosity is achievable at the same time. Furthermore, the improved contact allows for a more effective and controlled transfer of heat to the loose material.

In a variant of the first method, the loose material consists of particulate material.

An effect is to enable better mixing of different components of the loose material to be achieved than would be the case for fibrous material, for example. More generally, the porous body will have relatively uniform properties. A further effect is that it is possible to achieve essentially only point bonds between the particles, thus increasing the effective surface area available for fluid treatment where the particles include active particles for the treatment of the fluid. Where the rim is used as the mould, the rim provides immediate strength and protection, so that toughness is not such an important requirement of the porous body.

In a variant of the first embodiment, the step of providing the filter element further includes providing at least one piece of fabric in the mould prior to forming the porous body.

The or each piece of fabric is pervious to fluid. The piece(s) of fabric is or are placed in contact with the loose material prior to forming the porous body. As a result, the loose material can include relatively fine particles. The fabric is suitable for preventing these from being flushed out by the fluid, by having relatively small interstices. Thus, it is not absolutely necessary to use extremely fine binder particles as well. The fabric is pre-cut, which is easier than cutting a sandwich structure consisting of the porous body covered by the fabric from a larger plate. Moreover, the fabric is bound to the porous body and/or the rim in one manufacturing step.

In a second embodiment of the method, the rim is over-moulded.

This embodiment is relatively easy to implement. Furthermore, the bypass risk is reduced, because there is essentially no play between the rim and the porous body. This also reduces the likelihood of the porous body's being damaged. In an embodiment, the porous body is a sintered body comprising at least a thermoplastic binder.

In this embodiment, it is relatively easy to provide a rim that bonds sealingly with the porous body and is thus relatively effective in preventing any bypass of fluid. The porous body is obtained from a powder comprising at least the thermoplastic binder. The powder is heated to a temperature below or around the melting temperature of the binder. Optionally, pressure can be applied. The porosity and pore size will depend on a few process parameters.

In an embodiment, the porous body comprises a material for treatment of the fluid by sorption.

In this embodiment, the porous body actively filters out substances from the fluid, rather than acting only as a mechanical filter. Sorption can refer to absorption, adsorption and ion exchange. In one variant, the porous body comprises activated carbon, e.g. in the form of particles and/or chopped fibres that are thermally bonded by a binder, e.g. a thermoplastic binder. Instead of or in addition to the activated carbon, thermally bonded particles of an ion exchange or chelating resin may be comprised in the porous body.

In an embodiment, the cartridge housing part is essentially beaker-shaped and the fluid treatment medium is inserted into the cartridge housing part prior to combining the at least one filter element with the cartridge housing part.

An effect is to reduce the number of parts required to manufacture the cartridge. In particular, it is not necessary to provide a part forming the side walls and both a lid and a bottom part. Rather, the beaker-shaped cartridge housing part comprises one of the lid and the bottom and at most part of the other of the lid and the bottom. The filter element or elements close off the chamber for the fluid treatment medium.

In an embodiment, the fluid treatment medium is a granular medium.

This makes it relatively easy to fill the chamber or chambers of the cartridge in a uniform manner. As a result, the risk of channeling through the fluid treatment medium is reduced, resulting in more uniform fluid treatment. It is also relatively easy to automate the filing of the chamber or chambers, since most granular media can be poured. Where the filter element closes off an outlet opening of the chamber for the fluid treatment medium, the filter element mechanically filters at least the granular medium from the fluid before it leaves the chamber housing the fluid treatment medium.

In an embodiment, wherein the cartridge housing part includes an outer side wall, laterally enclosing the at least one chamber, inward-facing surfaces of the side wall terminate at one end in an edge defining at least one of the openings and lying essentially in a plane at an angle to the inward-facing surfaces of the side wall.

In a variant, the angle is at least 70°, in particular at least 80°, more particularly at least 85°. The angle may be at most 120°, in particular at most 110°, more particularly equal to or less than 100°, e.g. about 95° or less. With reference to a body axis of the cartridge that is perpendicular to the filter element, one end of the or each chamber can be formed completely by the filter element in this embodiment. As a consequence, flow of the fluid through the filter chamber or chambers will also be more closely parallel to the body axis and more uniform. The better this situation is achieved, the more uniform the treatment of the fluid, in particular its contact time with the fluid treatment medium in the chamber or chambers will be. Moreover, the first and second surface areas will be relatively large, so that the filter element will have a lower flow resistance for a given thickness and porosity.

In an embodiment, the cartridge housing part includes an outer side wall, laterally enclosing the at least one chamber and flaring outwards at at least one end at at least one location along its circumference.

This embodiment makes the tooling for the manufacturing method simpler. In particular, it is not necessary to insert any tools into the space enclosed by the outer side wall. This in turn makes it possible to provide a beaker-shaped cartridge housing part. The outer side wall is provided with outwardly directed tabs (where it does not flare out everywhere along its circumference) or a flange. The rim can be held against one side of the flange or tabs whilst a tool can be held against the other side of the flange or tabs. This tool can be part of a clamp where the bonding involves the use of an adhesive, a heating element where thermal welding is used or an anvil or sonotrode where ultrasonic welding is used. The latter method is particularly suited, because it is relatively effective at preventing migration of particles in the porous body to the surface of the rim or even the cartridge housing part.

According to another aspect of the invention, there is provided a cartridge for a fluid treatment system, in particular obtainable by a method according to the invention, the cartridge including:

a housing defining at least one chamber for a fluid treatment medium, the housing including a cartridge housing part including at least one wall defining at least one opening;

at least one filter element, the filter element closing at least one of the openings, wherein the filter element includes a porous body for at least mechanically filtering fluid flowing into the filter element through at least one first surface area of the filter element, through the porous body and out through at least one second surface area of the filter element, wherein the filter element includes a rim, impervious to fluid and covering at least a peripheral face of the porous body so as to frame the first and second surface areas, and wherein the rim is bonded to the cartridge housing part.

The bond can result in an interface comprising a weld seam or an adhesive, depending on the type of bonding used.

In an embodiment, the rim is welded to the cartridge housing part.

The porous body may be essentially planar, and the first and second surface areas may be essentially parallel to the plane of the porous body and face in opposite directions.

The porous body may be self-supporting.

In an embodiment of the cartridge, the rim is over-moulded.

In an embodiment of the cartridge, the porous body is a sintered body comprising at least a thermoplastic binder.

The porous body may comprise a material for treatment of the fluid by sorption.

The fluid treatment medium in at least one of the chambers may be a granular medium.

The cartridge housing part may include an outer side wall, laterally enclosing the at least one chamber and flaring outwards at at least one end at at least one location along its circumference.

In an embodiment, wherein the cartridge has a body axis defining first and second opposite ends of the cartridge, the at least one filter element is provided at the first end and at least one mechanism for attaching the cartridge to an outlet of a reservoir for accommodating untreated fluid is provided at the second end.

This cartridge is a pour-through cartridge, particularly suitable for a gravity-driven liquid treatment system in which liquid to be treated flows from the reservoir for accommodating untreated liquid through the cartridge and out into a reservoir for collecting the treated liquid, e.g. a jug or pitcher in an upper part of which the reservoir for untreated liquid is suspended. The filter element can extend over a relatively large area, providing the chamber housing the liquid treatment medium with a relatively large opening. In particular where the filter element comprises a liquid treatment medium for treatment of the liquid by sorption, the flow resistance of the cartridge can be reduced without compromising the efficacy of the liquid treatment. Moreover, it is not necessary to provide multiple filter elements or intricately shaped filter elements in order to provide space for the mechanism for attaching the cartridge to the outlet of the reservoir, because that mechanism is situated at the other end of the cartridge. The body axis (also referred to as an inertial axis) defines a direction along which two opposite ends of the cartridge housing can be made out.

In a variant of this embodiment, the mechanism for attaching the cartridge to an outlet of a reservoir for accommodating untreated fluid includes a mechanism for suspending the cartridge from the outlet of the reservoir.

The cartridge is thus configured for use in a gravity-driven filter system comprising a reservoir for accommodating untreated liquid, wherein the cartridge is sealingly attached to the outlet of the reservoir on an opposite side of a wall of the reservoir to the liquid in the reservoir. This configuration contrasts with filter systems in which the cartridge is inserted into a cartridge seat at a bottom of the reservoir from the inside of the reservoir. It follows that, in this variant, the filter element is arranged in an outlet of the chamber housing the liquid treatment medium, rather than an inlet. It is more effective to have the porous body in the outlet and a retainer with a larger mesh size in the inlet of the chamber, especially where the liquid treatment medium is also of a granular nature. This ensures that the overall flow resistance can be relatively low whilst foreign matter is still removed adequately from the treated liquid.

BRIEF DESCRIPTION OF THE DRAWINGS

The invention will be explained in further detail with reference to the accompanying drawings, in which.

DETAILED DESCRIPTION

In the following, examples of gravity-driven liquid treatment systems will be used to explain the principles of construction of a fluid treatment cartridge. These can be adapted to pressure-driven liquid treatment systems and indeed to gas treatment systems.

Any liquid can be treated, but the example used herein will be that of water. The treatment is primarily for removing substances suspended or dissolved in the water, but the water may additionally be enriched through the addition of certain substances.

Figure 1:
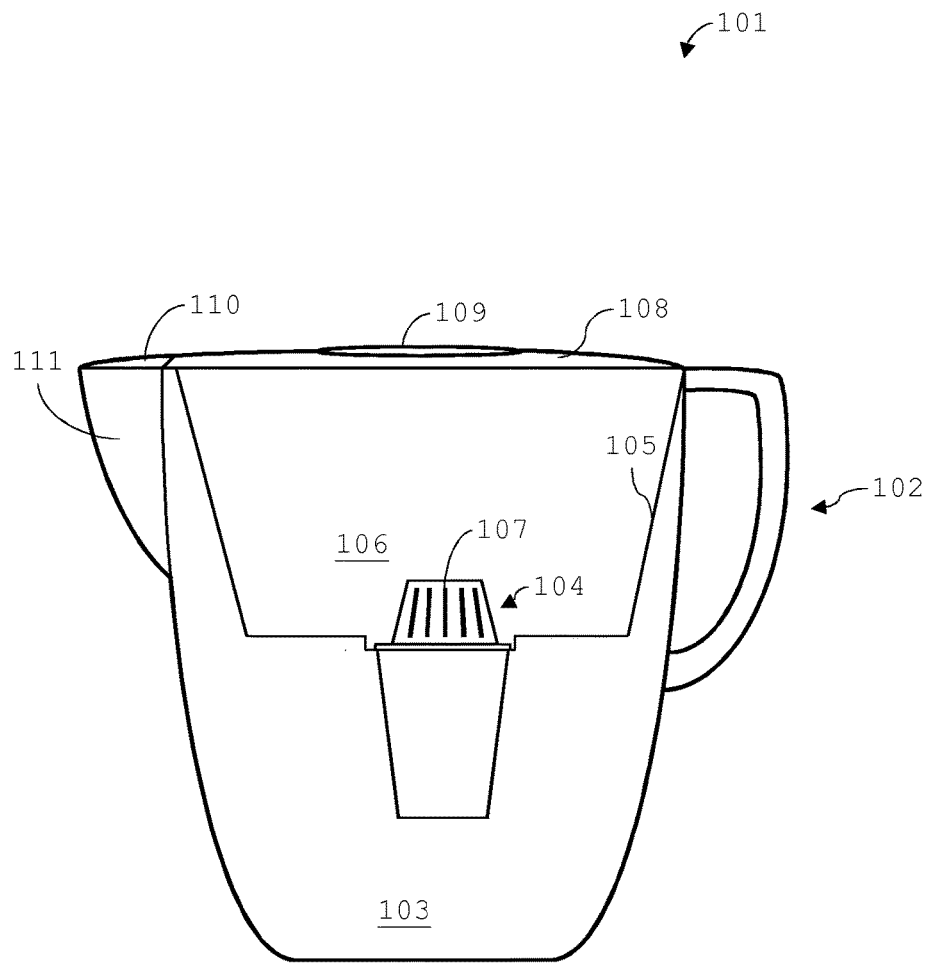
FIG. 1 is a very schematic side view of a gravity-driven liquid treatment system (not to scale)

A liquid treatment system 101 as shown in FIG. 1 includes a jug 102 of which the lower part forms a reservoir 103 for collecting water treated by a cartridge 104. A removable funnel 105 is suspended in the jug 102 in a manner known per se. The funnel 105 forms a reservoir 106 for water to be treated.

The funnel 105 is provided with a mechanical interface in the form of a seat in the region of the outlet of the funnel 105, in which the cartridge 104 can be inserted from the direction of the reservoir 106. The seat is adapted to the cartridge 104 so that, upon proper insertion of the latter, an essentially liquid-tight seal is provided between the cartridge 104 and the seat around the circumference of the cartridge 104. As a result, the outlet of the funnel 105 is essentially closed. The seat can comprise a ledge against which a flange of the cartridge 104 is pressed due to the weight of the cartridge 104 and of the water in the reservoir 106 or it can include a device for locking and/or clamping the cartridge 104 to the seat, e.g. a screw thread, bayonet fitting or the like.

The water in the reservoir 106 of untreated water is forced to flow through inlet openings 107 of the cartridge 104, through the cartridge 104, and out into the lower reservoir 103. The inlet openings 107 are located to one side of the seal between the cartridge 104 and the cartridge seat, this side corresponding to the reservoir 106 of untreated water. An outlet (not shown in FIG. 1) is located on the other side of the level of the seal, i.e. nearer to the reservoir 103 of treated water.

In a manner known per se (e.g. from WO 2005/092155 A1), the jug 102 is provided with a lid 108 with a fill opening closed by a pivotable closure 109. Similarly, a separate pivotable closure 1010 is provided to prevent contamination of the water in the lower reservoir 103 through an opening of a pouring spout 1011 of the jug 102.

A first variant (FIG. 2) of a cartridge 204 for use in the system 101 of FIG. 1 comprises a housing defining a chamber for a liquid treatment medium. A first housing part 212 is essentially beaker-shaped. It comprises a side wall 213 for forming a boundary of the chamber in radial direction with respect to a main axis 214 corresponding to a body axis of the first housing part 212 (all directions are with reference to the main axis, which is parallel to the main direction of flow through the chamber for housing the liquid treatment medium). In the illustrated embodiment, the first housing part 212 is rotationally symmetric with respect to the main axis 214, but the cross-section of the first housing part 212 can be oval, in particular elliptic, or polygonal in other embodiments. In the illustrated embodiment, the side wall 213 tapers toward one axial end, facilitating production of the first housing part 212 by injection moulding, in particular its ejection from mould. In another embodiment, the side wall 213 is cylindrical.

The first housing part 212 is completely open at one axial end, thus defining a first opening 215 It is provided with a protruding flange 216 at this end, the function of which will be explained in more detail below.

At the opposite axial end, the side wall 213 transitions into an approximately annular end wall 217 extending radially inwards from the side wall 213 over a distance just large enough to provide a stepped flange. Otherwise, the end wall 217 defines an opening 218 of the chamber that is closable by a filter element 219.

The filter element 219 includes a porous body 220 that is essentially planar, having a face directed towards the chamber for housing the liquid treatment medium and a face directed away from the cartridge 204 when the filter element 219 is in position in the opening 218.

To manufacture the filter element 219, first the porous body 220, which is self-supporting, is manufactured. One way of manufacturing the porous body is to provide a binder in granular or powder form that undergoes a heat treatment at relatively low pressure such that the binder particles are point-bonded together. The binder in this case can be a thermoplastic or thermosetting resin, e.g. polyethylene. A typical mass-mean diameter $d_{50}$ of the particles will be in the range of 10 to 300 µm, more particularly 90 to 150 µm. In one embodiment, the porous body 220 is cut, e.g. punched, from a larger porous sheet. Such a sheet can be formed by extrusion, by spreading the particles on a belt of a heated double-belt press or by passing the particles through the nip of a pair of heated rollers. In the case of a thermoplastic resin, the chosen temperature will a temperature sufficient for the resin to soften and become tacky, but it need not be at or above the melting temperature of the resin.

In an embodiment, the porous body 220 further includes a material for treatment of the liquid by sorption. This embodiment is obtainable by mixing the binder particles with particles of the treatment material. Examples of suitable treatment materials include activated carbon, ion exchange resins, chelating resins etc. In an embodiment, the porous body 220 is further configured to add one or more substances to fluid passing through it. In particular, water can be enriched through the addition of certain minerals. In a further embodiment, one or more materials with biocidal or bacterial growth-retarding properties can be comprised in the porous body. One simple embodiment is obtainable by mixing thermoplastic binder particles of the type described above with silver-coated particles or fibres of activated carbon.

It is observed that the porous body can be a laminated porous body. In such an embodiment, at least one of the average pore size, porosity, and material composition can be different for different layers of the laminated porous body. It is further observed that one or both of the axial end faces (with reference to the main axis 214, which is perpendicular to the plane of the porous body 220) can be covered by a sheet of woven or non-woven (including felted) textile. This helps retain small particles without having to decrease the average pore size of the porous body to such an extent that its resistance to flow would be unacceptably high. Such a sheet can be attached to a face of the porous body using adhesives, but it is simpler to attach it by heating the binder in the porous body 220 and applying a small amount of pressure.

In a final manufacturing step, the filter element 219 is provided with a rim 221 of material that is impervious to liquid. The rim 221 covers the radial end face of the porous body 220 and the edges of this end face, as well as a small area at the radially outer edges of the axial end faces. It thus provides a frame surrounding permeable surface areas on opposite sides of the filter element 219, which surface areas correspond to regions of the axial end faces of the porous body in embodiments in which these are not covered by a sheet of woven or non-woven textile.

The rim 221 can be formed by injection moulding with the porous body 220 provided as an insert. It is also possible to provide it as two halves that are inserted over the edges of the porous body 220 and bonded together, e.g. by welding or using adhesives. The rim 221 protects the filter element 219, enabling it to be manufactured at a different location to that at which the cartridge 204 is assembled.

In the process of assembling the cartridge 204, the filter element 219 is combined with the first housing part 212 by bonding the rim 221 to the flange defined by the end wall 217. It is possible to use adhesive bonding, but in the context of a cartridge for the treatment of a potable liquid, this would require the use of a food-grade adhesive, of which there aren't very many. Alternatively, the rim 221 can be welded to the end wall 217, the flange increasing the contact area and providing a surface against which to place a welding tool (not shown in FIG. 2). Thus, in the process of manufacturing the cartridge 204, the filter element 219 is placed in the opening 218 from the inside of the first housing part 212, a welding tool is inserted through the opening 215 at the opposite axial end of the first housing part 212 and a further tool is held against the flange defined by the end wall 217. The tools can be a sonotrode and anvil in the case of ultrasonic welding, for example.

After the filter element 219 has been combined with the first housing part 212 in this way, the liquid treatment medium (not shown) is inserted into the chamber such as to be retained by the filter element 219. The liquid treatment medium can be a granular medium, e.g. comprising particles of ion exchange resin, activated carbon and the like.

Subsequently, the chamber is closed by combining the first housing part 212 with a cap 222. The cap 222 is provided with a flange 223 that is joined to the protruding flange 216 of the first housing part 212, e.g. by welding.

Optionally, a mesh, e.g. as described in WO 01/32560 A2, is joined to the cap 222 prior to its attachment to the first housing part 212.

In use, water flows into the cartridge 204 through inlet openings 207 in the cap 222. In the illustrated embodiment, optional venting openings 224 are also provided to allow air to escape from the cartridge 204. The filter element 219, in particular the outward facing permeable surface area framed by the rim 221 forms a relatively large outlet aperture for discharging treated water from the cartridge 204.

Figure 2:
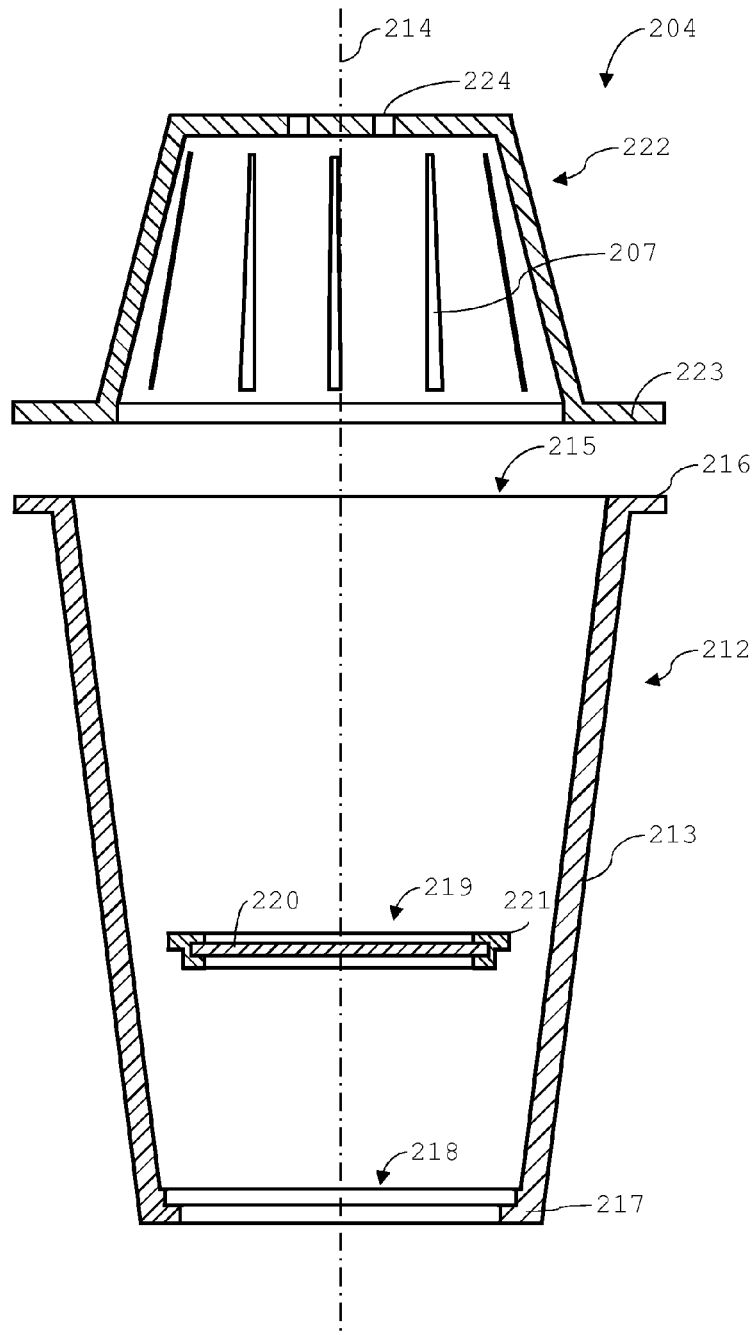
FIG. 2 is a very schematic exploded cross-sectional view of a first cartridge for use in the system of FIG. 1 (not to scale)
Figure 3:
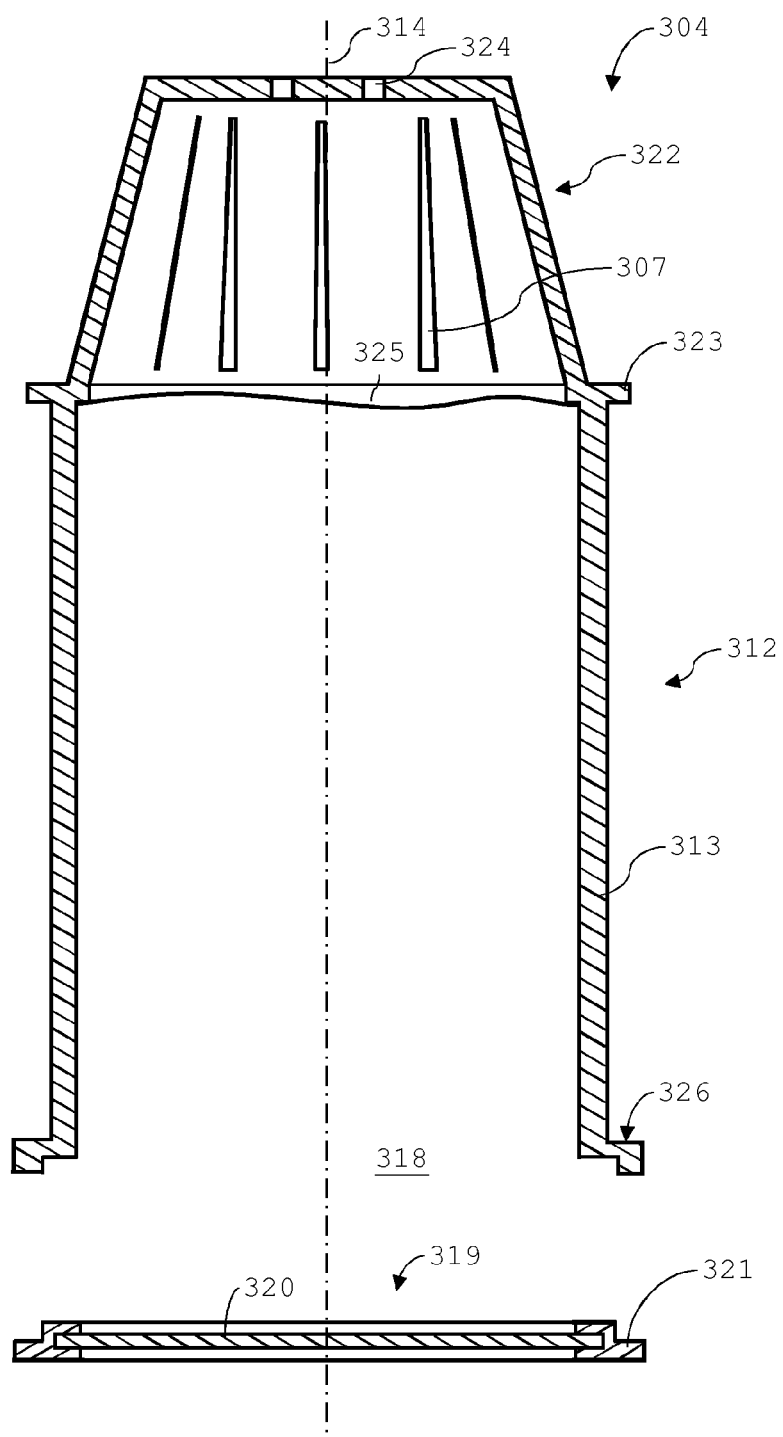
FIG. 3 is a very schematic exploded cross-sectional view of a second cartridge for use in the system of FIG. 1 (not to scale)

FIG. 3 shows a cartridge 304 that is a variant of the cartridge 204 of FIG. 2, but with fewer cartridge housing parts. The way in which it is assembled also differs.

A first housing part 312 includes not only a side wall 313 corresponding to the side wall 213 of the cartridge 204 of FIG. 2 but also an integral cap 322, such that the side wall 313 and the cap 322 form one monolithic part, obtainable by moulding, in particular injection moulding. The first housing part 3012 is thus essentially beaker-shaped.

The illustrated cap 322 is provided with inlet openings 307 and venting openings 324. A mesh 325 is bonded to the inside of the first housing part 312 between an axial section surrounded by the side wall 313, configured to form the chamber for housing the liquid treatment medium, and the inlet openings 307 and venting openings 324. A different kind of retaining device, liquid-permeable but arranged to block the passage of the liquid treatment medium, can be used.

It is observed that the first housing part 312 is also provided with a flange 316, which in this case serves only to form a seal with the cartridge seat in the outlet of the funnel 105. Compared to the cartridge 204 of FIG. 2, the cartridge 304 can be manufactured with one less welding step.

In the illustrated embodiment, the side wall 313 is essentially cylindrical, but it may also taper towards the closed axial end, i.e. away from an opening 318 closable by a filter element 319. The side wall 313 flares radially outwards all around its circumference at the opening 318. In an alternative embodiment, it may flare outwards along sections of its circumference only. There is thus defined a surface 326 for a tool to be used in joining the filter element 319 to the first housing part 312.

The filter element 319 is essentially the same as the filter element 219 of the cartridge 204 of FIG. 2. It is provided with a rim 321 that is bonded to the first housing part 312, in particular by welding. Thus, one of a sonotrode and anvil can be placed against the surface 326 and the other of the sonotrode and anvil placed against the rim 321, where the filter element 319 is ultrasonically welded to the first housing part 312.

The joining of the filter element 319 to the first housing part 312 takes place after the chamber formed by the first housing part 312 and closable by the filter element 319 has been filled with a liquid treatment medium. The first housing part 312 is held with the opening 318 facing upwards during the filling operation, whereupon the filter element 319 is joined to the first housing part 312.

It is observed that the side wall 313 terminates at an edge defining the opening 318, so that the opening is defined only by the edge of the side wall 313. There is no end wall extending radially inwards. In combination with the radially outwardly flaring side wall 313 and an appropriately sized rim 321 of the filter element 319, this maximizes the area of the outlet formed by the porous body 320. The relatively large surface area causes a decrease in the flow resistance of the filter element 319. Where the porous body 320 includes active substances that are effective in removing substances from the liquid by sorption and/or active substances that are effective to add substances to the liquid, the resistance to flow per unit area can be increased to increase the effectiveness of the liquid treatment by the filter element 319 without increasing the pour-through time of the cartridge 304 to an unacceptable level, as a consequence.

The description of the filter element 219 of FIG. 2 applies equally to the filter element 319 of FIG. 3.

Figure 4:
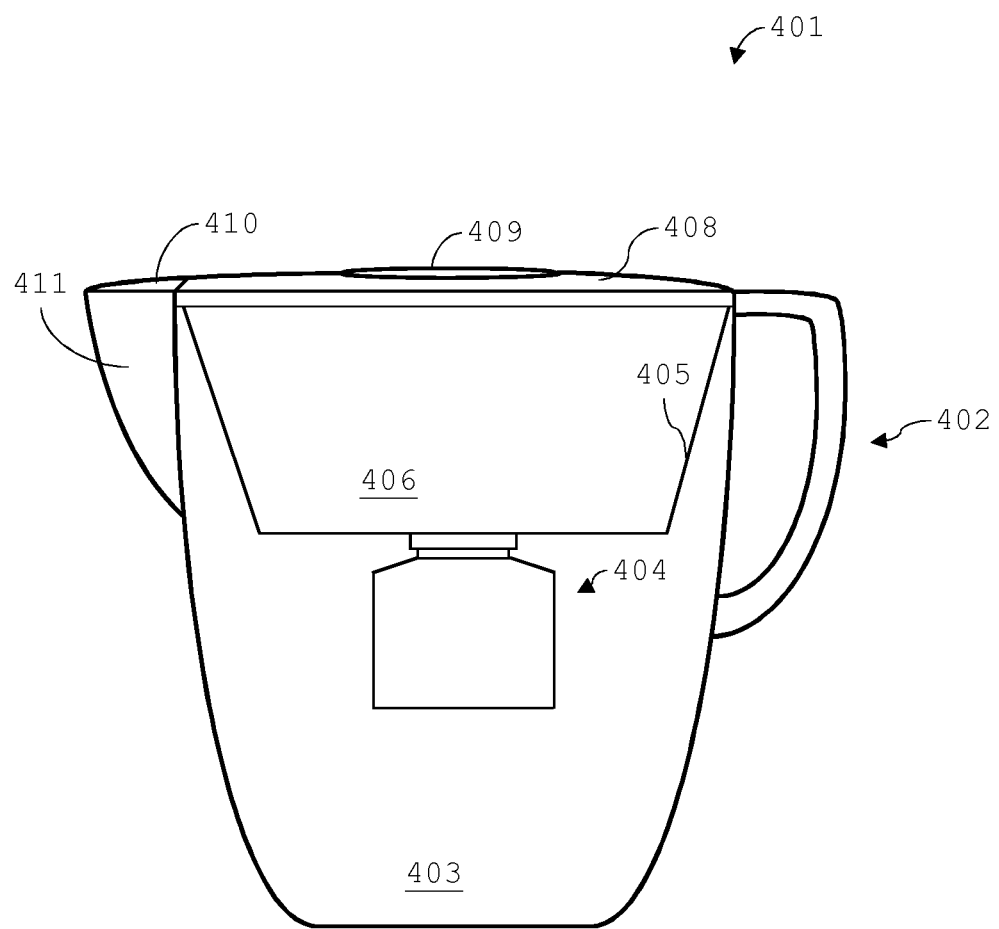
FIG. 4 is a very schematic side view of a second gravity-driven liquid treatment system (not to scale)

FIG. 4 shows an alternative liquid treatment system 401. It again includes a jug 402 with a pouring spout 411 and a lid 408 with pivotable closures 409,410. Again, a funnel 405 forming a reservoir 406 for liquid to be treated is suspended in the jug 402 in a manner known per se. The cartridge 404 is connected to a mechanical interface 427 of the funnel 405 in a different manner, in that the mechanical interface 427 is provided downstream of an outlet opening of the funnel 405 with respect to the reservoir 406 of untreated liquid defined by the funnel 405. Thus, in use, the replaceable cartridge 404 is suspended in the jug 402 over a reservoir 403 of treated water.

Figure 5:
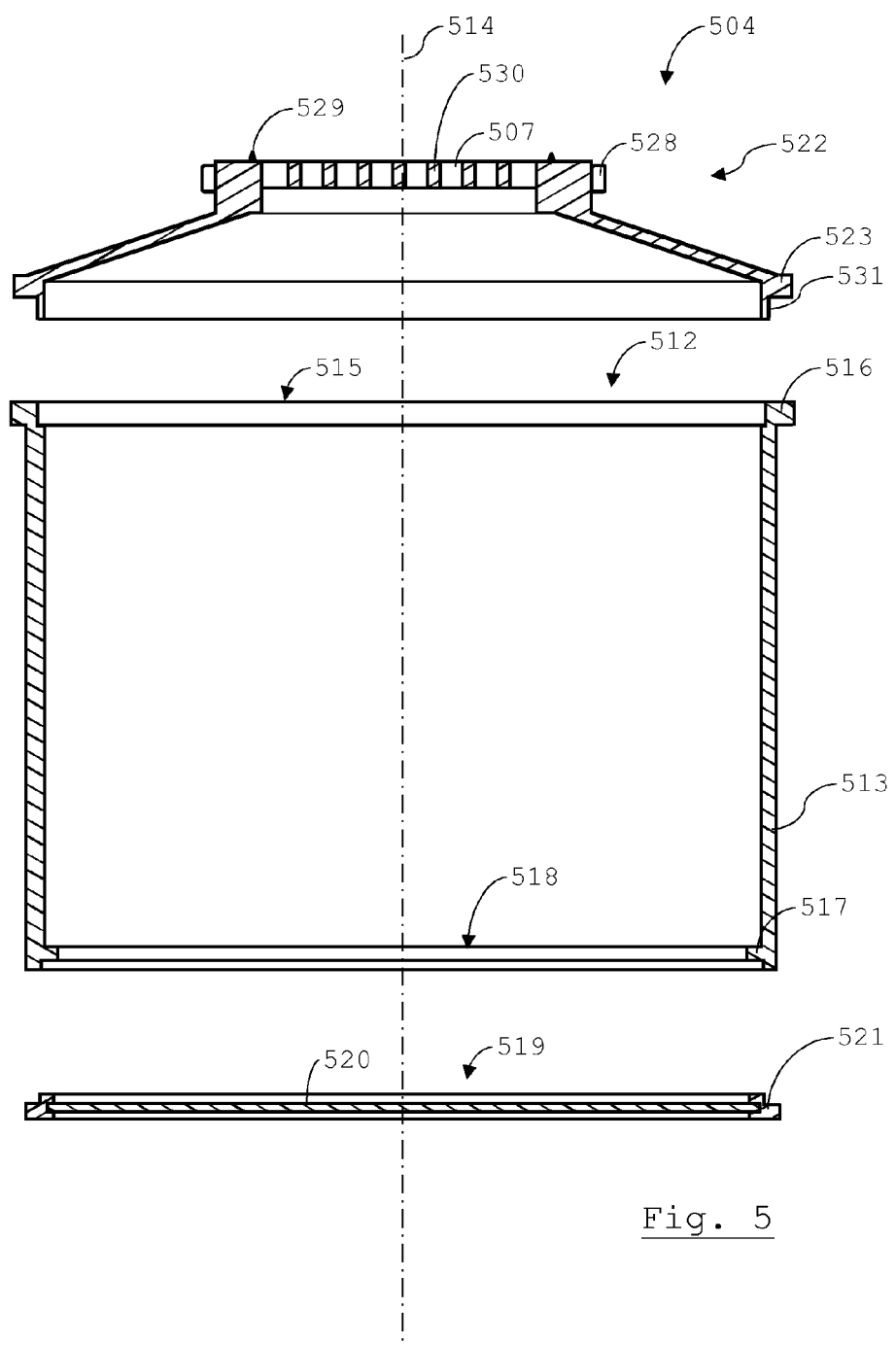
FIG. 5 is a very schematic exploded cross-sectional view (not to scale) of a cartridge for use in the system of FIG. 4 (not to scale)

FIG. 5 shows a suitable cartridge 504 for the system 401 of FIG. 4. The liquid treatment medium is not shown for reasons of clarity. The cartridge 504 comprises a cartridge housing including a first housing part 512 that includes a mainly cylindrical side wall 513. In other embodiments, the side wall 513 can have an oval or polygonal cross-section. The first housing part 512 is provided with a radially outwardly extending flange 516 at one axial end (with respect to a main axis 514 corresponding to a body axis essentially aligned with the main direction of flow through the cartridge 504). The flange 516 is provided to facilitate the joining of the first housing part 512 to a cap 522, with the joint being formed by bonding, in particular by welding.

The cap 522 includes a cap flange 523 arranged to cooperate with the flange 516 of the first housing part 512. It further includes lugs 528 forming a mechanism for attaching the cartridge 504 to the reservoir 506 of untreated liquid. The lugs 528 are part of a bayonet fitting, and are arranged to be inserted into guides (not shown) forming part of the mechanical interface 527 in a manner known per se. These guides will generally be provided with a slight speed, so that the cartridge 504 is forced towards the reservoir 506 as the lugs 528 are moved along the guides. In the process, one or more sealing elements 529 on a top surface of the cap 522 are compressed against a sealing surface provided in the mechanical interface 527, so that a sealed fluid connection between an outlet of the reservoir 506 and inlet openings 507 in the cap 522 is provided. The inlet openings 507 are defined by bars 530 of a lattice in the top of the cap 522. Optionally (not shown here), venting openings can be provided in a section of the cap 522 lying radially outside the confines of the part sealed against the funnel 505. Optionally, a mesh similar to the mesh 525 of the cartridge 304 can be provided to prevent back-flow of liquid treatment medium, but the inlet openings 507 will generally be of sufficiently small size relative to the liquid treatment granules to take on this role.

At the opposite axial end to the end for connection to the cap 522, the first housing part 512 an end wall 517 that extends radially inwards only slightly defines an opening 518 closable by a filter element 519. The filter element 519 is essentially identical to the filter elements 219,319 of FIGS. 2 and 3, so that reference is made to the description provided above in connection with the filter element 219 of FIG. 2.

The cartridge 504 is assembled by first joining the filter element 519 to the first housing part 512. The rim 521 of the filter element 519 is joined to the stepped flange defined by the end wall 517, in particular by bonding. A tool such as an anvil or sonotrode can be inserted into the space defined by the first housing part 512 to enable the filter element 519 to be combined with the first housing part 512.

After the joint has been formed, the resulting beaker-shaped assembly is filled with the liquid treatment medium. The description of the liquid treatment medium provided above in connection with the cartridge 204 of FIG. 2 applies also to the liquid treatment medium for the cartridge 504 of FIG. 5.

Thereupon the cap 522 is combined with the first housing part 512 to close the chamber accommodating the liquid treatment medium.

Figure 6:
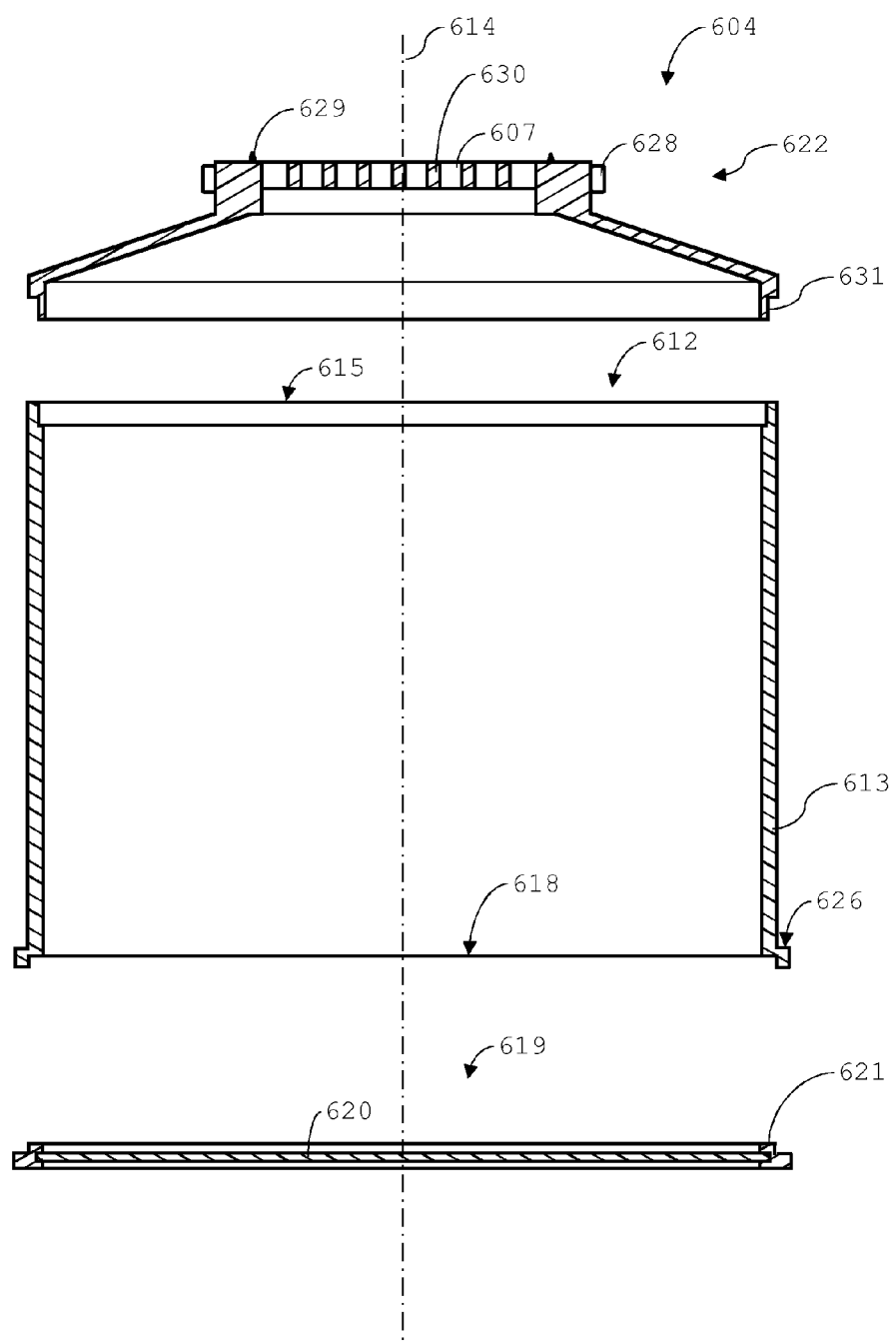
FIG. 6 is a very schematic exploded cross-sectional view (not to scale) of a second cartridge for use in the system of FIG. 4 (not to scale)

FIG. 6 illustrates a cartridge 604 that is a variant of the cartridge 504 of FIG. 5. It has a cap 622 that is identical to the cap 522 of the cartridge 504 of FIG. 5, so that reference is made to the description given above in respect of that cap 522.

The cartridge 604 further includes a filter element 619 which is identical to that of the cartridges 204,304,504 described above, so that the description given above with respect the filter element 219 of FIG. 2 applies equally to the filter element 619 of FIG. 6.

The first housing part 612 of the cartridge 604 of FIG. 6 includes a side wall 613 for forming a boundary of a chamber for accommodating a liquid treatment medium in radial direction with respect to a main axis 614 corresponding to a body axis of the first housing part 612 (the main axis 614 is again aligned with the main direction of flow through the chamber for housing the liquid treatment medium). In the illustrated embodiment, the first housing part 612 is rotationally symmetric with respect to the main axis 614, but the cross-section of the first housing part 612 can be oval, in particular elliptic, or polygonal in other embodiments. It may also taper towards either axial end.

One axial end of the side wall 613 is configured for joining to an annular wall 631 depending from the cap 622 and forming an integral part of the cap 622. The joint can be formed by bonding, in particular welding, more particularly ultrasonic welding. In the illustrated embodiment, neither the cap 622 nor the end of the first housing part 612 to be joined to the cap 622 is provided with a radially outwardly protruding flange. Instead, the radially outwardly facing surface of the side wall 613 is essentially flush with a side wall of the cap 622 when the latter has been joined to the first housing part 612. This gives the cartridge a smooth appearance and represents a materials saving.

At the opposite axial end, an inner surface of the side wall 613 terminates in an edge defining an opening 618 closable by the filter element 619. At this end, the side wall 613 of the first housing part 612 also flares outwards to define a surface 626 for a tool.

To assemble the cartridge 604, the cap 622 is first joined to the first housing part 612. The assembly is then held such that the opening 618 closable by the filter element 619 faces upwards, and the liquid treatment medium is then inserted into the assembly. Thereupon, the filter element 619 is combined with the first housing part 612. Again, this involves joining a rim 621 of the filter element 619 to the first housing part 612 by bonding, in particular by welding. A tool can be applied to the surface 626 to effect the bonding operation.

Figure 7:
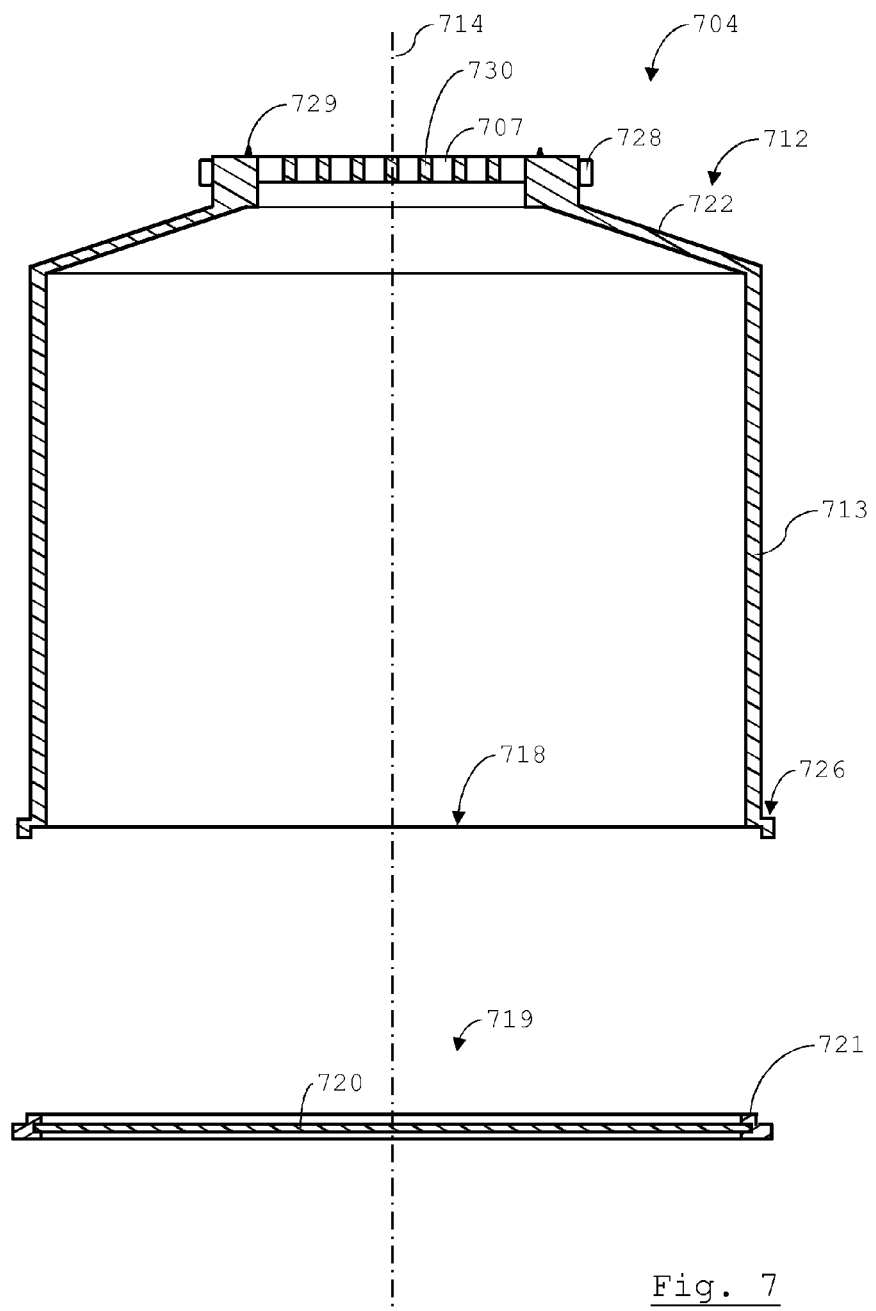
FIG. 7 is a very schematic exploded cross-sectional view (not to scale) of a third cartridge for use in the system of FIG. 4.

FIG. 7 illustrates a cartridge 704 that is a variant of the cartridge 604 of FIG. 6, in which the first housing part 712 includes the cap 722 as an integral part that forms a monolithic whole with the side wall 713. The first housing part 712 is obtainable by moulding, in particular injection moulding. Compared to the cartridge 604 of FIG. 6, the cartridge 704 of FIG. 7 can be assembled with one less joining operation. However, the range of possible configurations of features of the cap 722 may be limited due to restrictions imposed by the injection moulding tools.

Figure 8:
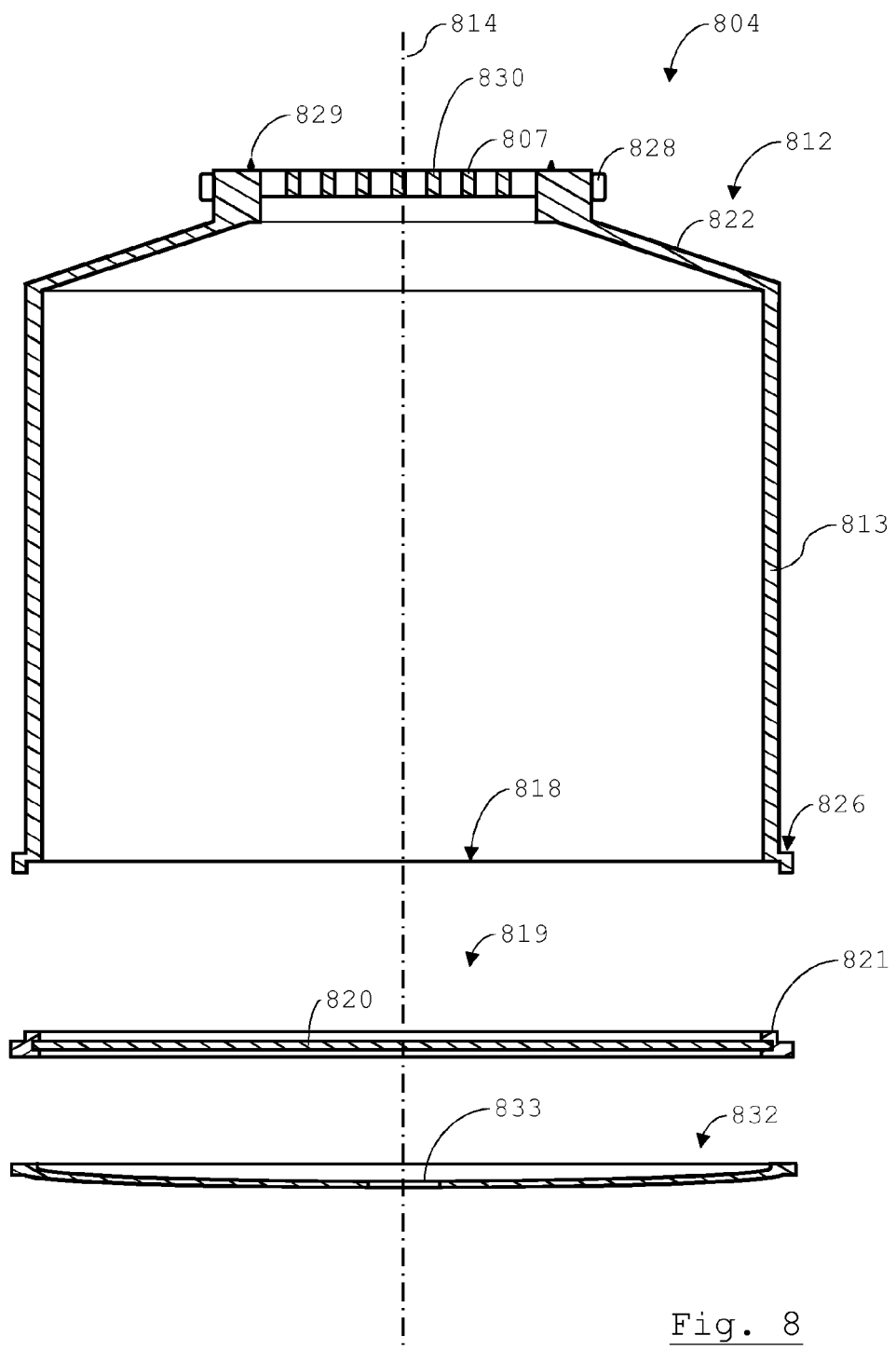
FIG. 8 is a very schematic exploded cross-sectional view (not to scale) of a modified version of the cartridge of FIG. 7.
Figure 9:
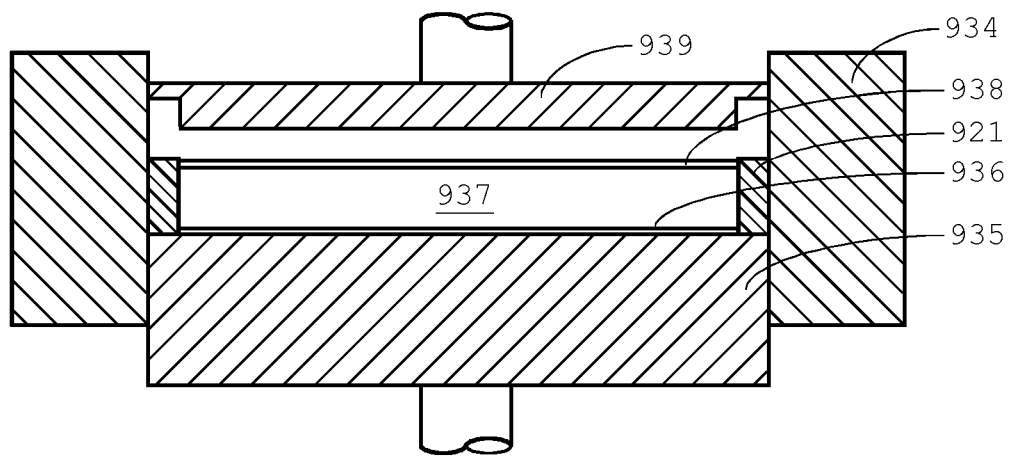
FIG. 9 is a schematic cross-sectional view of an apparatus for manufacturing a filter element for any of the cartridges of FIGS. 1-8.

FIG. 8 illustrates a cartridge 804 that is identical to the cartridge 704 of FIG. 7 except that it further includes a cover part 832. The cover part 832 illustrated in FIG. 8 is configured to be joined to the rim 821 of the filter element 819. In an alternative embodiment (not shown), it is joined to the first housing part 812.

Like the other illustrated filter elements 219,319,519,619, 719, the filter element 819 has a first surface area framed by the rim 821 through which liquid flows into the porous body 820, which surface area faces the chamber accommodating the liquid treatment medium. The liquid flows out through an opposite second surface area framed by the rim 821. The cover part 832 is provided with at least one, in the illustrated embodiment exactly one, fluid-permeable aperture 833. Once it has been combined with the assembly of the first housing part 8012 and the filter element 819, the cover part 832 is situated with a wall facing the second surface area of the filter element 819. The cover part 832 thus shields the exposed part of the filter element 819 that is not covered by the rim 821. This exposed part will generally be the porous body or a sheet of woven or non-woven textile covering the porous body. The cover part 832 shields this relatively vulnerable part of the filter element 819.

The wall facing the second surface area of the filter element is slightly concave, so that a cavity is defined between the filter element 819 and the cover part 832. As a result, the surface area framed by the rim 821 is not limited by the cover part 832. The flow resistance of the fluid-permeable aperture 833 is lower than that of the filter element 819, so that the cover part 832 has no negative impact on the overall pour-through time of the cartridge 804.

An alternative way of manufacturing the filter elements 219,319,519,619,719,819 to the one described above in connection with the filter element 219 of FIG. 2 includes thermally binding loose material in a mould. In this method, a rim 921 is first placed in a heatable cavity-providing tool 934. The tool 934 surrounds an outward-facing surface of the rim 921.

A first heatable die 935 supports the rim 921 from below.

In an optional step, a first piece of fabric 936 is placed in a space surrounded and delimited laterally by the rim 921, on top of the first heatable die 935. The fabric 936 may be a non-woven fabric, for example.

A quantity 937 of loose, in this example particulate, material is placed on top of the first piece of fabric 936 in the space surrounded and delimited laterally by the rim 921. The material includes a binder in granular or powder form, e.g. a thermoplastic or thermosetting resin. In an embodiment, the binder comprises ultra-high density polyethylene. The loose material further includes a material for the treatment of the liquid by sorption. This latter material will generally also be provided in granular form and is mixed with the binder before being placed in the space delimited laterally by the rim 921. Again, suitable treatment materials include activated carbon, ion exchange resins, chelating resins and the like. The particle sizes are as indicated for the embodiment explained with reference to FIG. 2.

The quantity 937 of loose material is compacted by doctoring or by vibrating the assembly comprising the tool 934 and the first heatable die 935.

In an optional step, a second piece of fabric 938 is placed on top of the quantity 937 of loose material. The second piece of fabric 938 has essentially the same properties as the first piece of fabric 936.

Where the binder comprises a thermoplastic resin, the first heatable die 935, the tool 934 and a second heatable die 939 are heated to a temperature sufficient to make the binder become tacky (above the Vicat softening point but below the decomposition temperature). It is sufficient to place the first and second heatable dies 935,939 at positions corresponding to the desired position of the opposing end faces of the filter element and to provide enough material to allow these positions to be taken in without exerting excess pressure. The pressure needed to achieve point-bonds between the particles arises through the expansion of the binder under the influence of heat.

In the process, the quantity 937 of loose material is formed into a porous body. It is also bonded to the first and second pieces 936,938 of fabric and the rim 921. Thereupon, one of the first and second heatable dies 935,939 is moved out of the way and the other is used to eject the filter element from the tool 934, whereupon it is left to cool. It can then be used to manufacture any of the cartridges 104,204,304,404, 504,604,704,804 described above.

The invention is not limited to the embodiments described above, which may be varied within the scope of the accompanying claims. Suitable materials for the cartridge housing include thermoplastics, in particular polypropylene. This allows both thermal and ultrasonic welding. The material of the rim of the filter element can be the same as that of the first housing part or it can be a different in terms of at least one of its material composition and physical properties. Variants of any of the cartridges 204,304,504,604,704 can be provided with a cover part such as the one illustrated in FIG. 8.

We claim:

1. A method of manufacturing a cartridge for a fluid treatment system, wherein the cartridge includes a housing defining at least one chamber, including:
   providing a cartridge housing part including at least one wall defining at least one opening closable by a filter element;
   providing the filter element, wherein the filter element includes a porous body for at least mechanically filtering fluid flowing into the filter element through at least one first surface area of the filter element, through the porous body and out through at least one second surface area of the filter element, wherein the porous body is a sintered body comprising at least a binder, and wherein the filter element includes a rim, attached to the porous body and covering at least a peripheral face of the porous body so as to frame the first and second surface areas; and
   combining the filter element with the cartridge housing part so as to close the at least one opening by bonding the rim to the cartridge housing part by welding, soldering or adhesive bonding via an adhesive or filler material.

2. The method according to claim 1, wherein the cartridge housing is made of thermoplastic material and the rim is ultrasonically welded to the cartridge housing part.

3. The method according to claim 1, wherein the porous body is planar, and wherein the first and second surface areas are essentially parallel to a plane of the porous body and face in opposite directions.

4. The method according to claim 1, wherein the porous body is self-supporting.

5. The method according to claim 1, wherein the step of providing the filter element includes:
   providing an amount of loose material including a binder in a mould; and
   causing the loose material to be bound in the mould.

6. The method according to claim 1, wherein the rim is over-moulded.

7. The method according to claim 1, wherein the binder is a thermoplastic binder.

8. The method according to claim 1, wherein the porous body comprises a material for treatment of the fluid by sorption.

9. The method according to claim 1, wherein a fluid treatment medium is inserted into the cartridge housing part prior to combining the filter element with the cartridge housing part.

10. The method according to claim 1, wherein the chamber contains a granular fluid treatment medium.

11. The method according to claim 4, wherein the cartridge housing part includes an outer side wall, laterally enclosing the at least one chamber, wherein inward-facing surfaces of the side wall terminate at one end in an edge defining the at least one opening and lying essentially in a plane at an angle to the inward-facing surfaces of the side wall, and wherein the outer side wall flares outwards along its circumference, so that only the edge defines the at least one opening.

12. A cartridge for a fluid treatment system, including:
   a housing defining at least one chamber, the housing including a cartridge housing part including at least one wall defining at least one opening;
   at least one filter element, the filter element closing the at least one opening,
   wherein the filter element includes a porous body for at least mechanically filtering fluid flowing into the filter element through at least one first surface area of the filter element, through the porous body and out through at least one second surface area of the filter element,
   wherein the porous body is a sintered body comprising at least a binder,
   wherein the filter element includes a rim, attached to the porous body and covering at least a peripheral face of the porous body so as to frame the first and second surface areas, and
   wherein the rim is welded, soldered or adhesively bonded via an adhesive or filler material to the cartridge housing part.

13. The cartridge according to claim 12, having a body axis defining first and second opposite ends of the cartridge, wherein the at least one filter element is provided at the first end and at least one mechanism for attaching the cartridge to an outlet of a reservoir for accommodating untreated fluid is provided at the second end.

14. A fluid treatment system, including:
   a cartridge comprising;
   a housing defining at least one chamber, the housing including a cartridge housing part including at least one wall defining at least one opening;
   at least one filter element, the filter element closing the at least one opening,
   wherein the filter element includes a porous body for at least mechanically filtering fluid flowing into the filter element through at least one first surface area of the filter element, through the porous body and out through at least one second surface area of the filter element,
   wherein the porous body is a sintered body comprising at least a binder and wherein the filter element includes a rim, attached to the porous body and covering at least a peripheral face of the porous body so as to frame the first and second surface areas, and wherein the rim is welded, soldered or adhesively bonded via an adhesive or filler material to the cartridge housing part;

a mechanical interface for connecting the cartridge to a supply of untreated fluid so as to establish a fluid-tight connection with an inlet of the cartridge; and a device for collecting fluid treated in the cartridge.

15. The method according to claim 1, wherein the rim has a lower permeability to fluid than the porous body.

16. The cartridge according to claim 12, wherein the rim has a lower permeability to fluid than the porous body.

17. The fluid treatment system according to claim 14, wherein the rim has a lower permeability to fluid than the porous body.

18. The method according to claim 1, wherein the binder comprises point-bonded particles.

19. The method according to claim 1, wherein the porous body is formed of loose material bound by the binder.

20. The method according to claim 1, wherein the porous body is planar and one or both surfaces of the porous body parallel to a plane of the porous body are covered by a sheet of permeable textile.

21. The method according to claim 1, wherein the filter element is arranged in an outlet of the chamber and a retainer with a larger mesh size is arranged in an inlet of the chamber.

22. The method according to claim 4, wherein the cartridge housing part includes an outer side wall, laterally enclosing the at least one chamber, and transitioning at an axial end into an end wall, wherein the end wall extends radially inwards over a distance large enough to provide a flange defining an opening, and wherein the opening is closed by the filter element by bonding the rim to the flange.

23. The cartridge according to claim 12, wherein the porous body is self-supporting, wherein the cartridge housing part includes an outer side wall, laterally enclosing the at least one chamber, and transitioning at an axial end into an end wall, wherein the end wall extends radially inwards over a distance large enough to provide a flange defining an opening, and wherein the rim is bonded to the flange so that the filter element closes the opening.

24. The cartridge according to claim 12, wherein the porous body is self-supporting, wherein the cartridge housing part includes an outer side wall, laterally enclosing the at least one chamber, terminate at one end in an edge defining the at least one opening and lying in a plane at an angle to inward-facing surfaces of the side wall, and, wherein the outer side wall flares outwards along its circumference, so that only the edge defines the at least one opening.

25. The cartridge according to claim 12, wherein the binder is a thermoplastic binder.

26. The cartridge according to claim 12, wherein the binder comprises point-bonded particles.

27. The cartridge according to claim 12, wherein the porous body is formed of loose material bound by the binder.

28. The cartridge according to claim 12, wherein the porous body is planar and one or both surfaces of the porous body parallel to a plane of the porous body are covered by a sheet of permeable textile.

29. The cartridge according to claim 12, wherein the filter element is arranged in an outlet of the chamber and a retainer with a larger mesh size is arranged in an inlet of the chamber.

30. The fluid treatment system according to claim 14, wherein the porous body is self-supporting, wherein the cartridge housing part includes an outer side wall, laterally enclosing the at least one chamber, and transitioning at an axial end into an end wall, wherein the end wall extends radially inwards over a distance large enough to provide a flange defining an opening, and wherein the rim is bonded to the flange so that the filter element closes the opening.

31. The fluid treatment system according to claim 14, wherein the porous body is self-supporting, wherein the cartridge housing part includes an outer side wall, laterally enclosing the at least one chamber, terminate at one end in an edge defining the at least one opening and lying in a plane at an angle to inward-facing surfaces of the side wall, and, wherein the outer side wall flares outwards along its circumference, so that only the edge defines the at least one opening.

32. The fluid treatment system according to claim 14, wherein the binder is a thermoplastic binder.

33. The fluid treatment system according to claim 14, wherein the binder comprises point-bonded particles.

34. The fluid treatment system according to claim 14, wherein the porous body is formed of loose material bound by the binder.

35. The fluid treatment system according to claim 14, wherein the porous body is planar and one or both surfaces of the porous body parallel to a plane of the porous body are covered by a sheet of permeable textile.

36. The fluid treatment system according to claim 14, wherein the filter element is arranged in an outlet of the chamber and a retainer with a larger mesh size is arranged in an inlet of the chamber.

37. The method according to claim 5, further comprising:

providing the rim; and using the rim as at least part of the mould, wherein the step of causing the loose material to be bound to the mould includes causing the porous body to bind to the rim.

* * * * *